United States Patent

Sigdell

[11] 4,172,794
[45] Oct. 30, 1979

[54] HOLLOW FIBER DIALYSER

[75] Inventor: Jan-Erik Sigdell, Bad Homburg von der Hohe, Fed. Rep. of Germany

[73] Assignee: Dr. Eduard Fresenius Chemisch-pharmazeutische Industrie KG Apparatebau KG, Bad Homburg von der Hohe, Fed. Rep. of Germany

[21] Appl. No.: 900,660

[22] Filed: Apr. 27, 1978

[30] Foreign Application Priority Data

May 12, 1977 [DE] Fed. Rep. of Germany ....... 2721444

[51] Int. Cl.² .............................................. B01D 31/00
[52] U.S. Cl. .................... 210/232; 210/321 B
[58] Field of Search ...................... 210/22, 232, 321 R, 210/321 A, 321 B; 55/16, 158; 23/258JM

[56] References Cited

U.S. PATENT DOCUMENTS

| 3,228,876 | 1/1966 | Mahon | 210/22 |
| 3,536,611 | 10/1970 | De Filippi et al. | 210/22 |
| 3,832,830 | 9/1974 | Gerow | 55/158 |

Primary Examiner—Frank A. Spear, Jr.
Attorney, Agent, or Firm—W. G. Fasse; D. F. Gould

[57] ABSTRACT

A hollow fiber dialyser comprises a webbing of hollow fibers. A loose warp thread at each end of a webbing wound on a core, acts as a wick barrier to prevent sealant from leaking into the interstices between the hollow fibers. A tight warp thread nearest the open ends of the fibers pinches off the free inner cross section of each hollow fiber to prevent sealant from penetrating into the hollow fibers.

3 Claims, 3 Drawing Figures

HOLLOW FIBER DIALYSER

BACKGROUND OF THE INVENTION

The invention relates to a hollow fiber dialyser with a core which is encircled by hollow fibers arranged in ring formation.

Hollow fiber dialysers of the type mentioned have been known for a long time. Such dialysers differ from one another only slightly in the form in which they are made. All steps which in the manufacture of the hollow fiber dialysers, relate to the precise arrangement of the hollow fibers on the core and to the casting of the free ends in a poured sealant, are expensive. In order to attain the desired flow conditions within the hollow fiber dialyser, it is necessary that the hollow fibers assume an exact prescribed position, and further that the mass of the poured sealant be of uniform thickness across the entire cross section of the dialyser. It is also necessary that the poured sealant does not penetrate into the hollow fibers.

OBJECTS OF THE INVENTION

The invention aims at solving the problem of providing a means by which a hollow fiber dialyser of the type mentioned may be manufactured in a simpler manner and at lesser expense than before.

SUMMARY OF THE INVENTION

To solve this problem, the invention provides that the hollow fibers are bound to one another by means of threads which form a web wherein the hollow fibers extend crosswise. This web is wound around the core. The hollow fibers or sections of hollow fibers are fastened parallel to one another by means of the threads to form a web of optional length. In this manner it is particularly easy to wind the fibers around the core. The problem of attaching and fixing the hollow fibers on the core is thus completely eliminated.

Furthermore, the invention provides that the hollow fiber web has at least one closure thread near the open ends of the hollow fibers completely encircling the fibers and pinching off the free cross section of the hollow fibers. With the help of this closure thread said sealant is prevented from penetrating into the hollow fibers when the sealant is poured over the free ends of the hollow fibers.

The invention further provides that some distance from each of the closure threads which run in the direction of the length of the web, there is arranged at least one sealing thread for sealing off the free space between the hollow fibers so that the poured sealant cannot penetrate into said free space. The closure thread insures that the poured sealant does not enter inside the hollow fibers. The function of the sealing thread arranged some distance from the closure thread, is to prevent the poured material, which rips due to the capillary effect in the space between the fibers contacting each other, from penetrating beyond a predetermined range. Additional features of the invention may be found in the description and in the drawing.

BRIEF FIGURE DESCRIPTION

The invention will be explained in more detail with reference to an example embodiment shown in the drawing, wherein.

DETAILED DESCRIPTION OF PREFERRED EXAMPLE EMBODIMENTS

Figure 1:
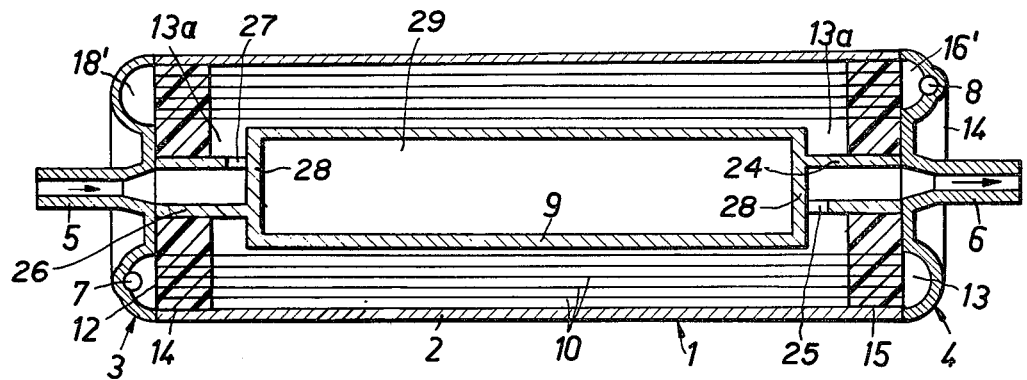
FIG. 1 is a section through a hollow fiber dialyser.
Figure 2:
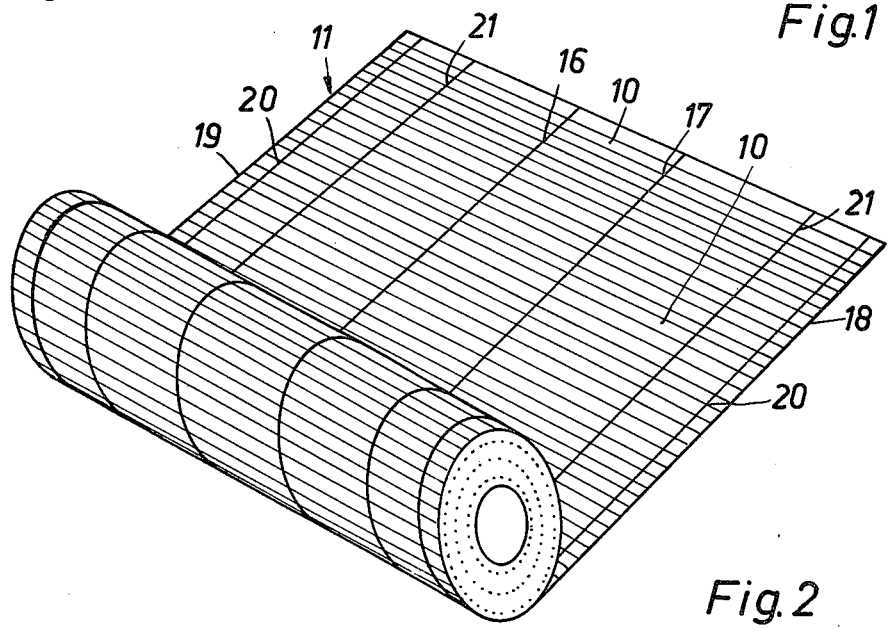
FIG. 2 shows a hollow fiber web used according to the invention.

A hollow fiber dialsyer 1 as shown in FIG. 1 comprises a casing 2. Cover members 3 and 4 are attached to the facing ends of this casing. The cover members are provided with intake and output nipples 5, 6 for the dialysing solution and with intake and output ports 7, 8 for the blood to be dialysed. A core 9 is arranged within the casing 2. The core 9 has a nipple 24 with a lateral flow passage 25 which communicates with the output nipple 6. The core 9 further has a nipple 26 with a lateral flow passage 27 which communicates with the intake nipple 5. Otherwise the core 9 is closed at both ends 28 and the space 29 may be empty. The cover 3 encloses a blood distribution cavity 18' in communication with the blood intake port 7. The cover 4 encloses a cavity 16' in communication with the blood output port 8. A web 11 comprising hollow fibers 10 extending crosswise to the web as seen in FIG. 2 is wound on the hollow core 9. The free ends 12, 13 of the hollow fibers 10 are imbedded in a conventional manner in a poured sealant 14, 15. The sealant not only holds the hollow fibers together, it also keeps the flow paths for the blood and the dialysing solution apart from one another.

The hollow fiber web 11 as shown in FIG. 2 comprises hollow fibers 10 or sections of hollow fibers 10 extending crosswise to the web, which fibers are held together by several threads 16, 17 running in the direction of the web 11. The number of threads depends upon the width of the web.

Near the open ends 12, 13 of the hollow fibers 10 there is arranged at least one closure thread 20 which is looped tightly around the hollow fibers thereby pinching off the free space cross section of the hollow fibers. Some distance from the closure thread 20 there is arranged an additional sealing thread 21 running in the direction of the web 11. The function and the way the sealing thread is effective is best seen in FIG. 3.

Figure 3:
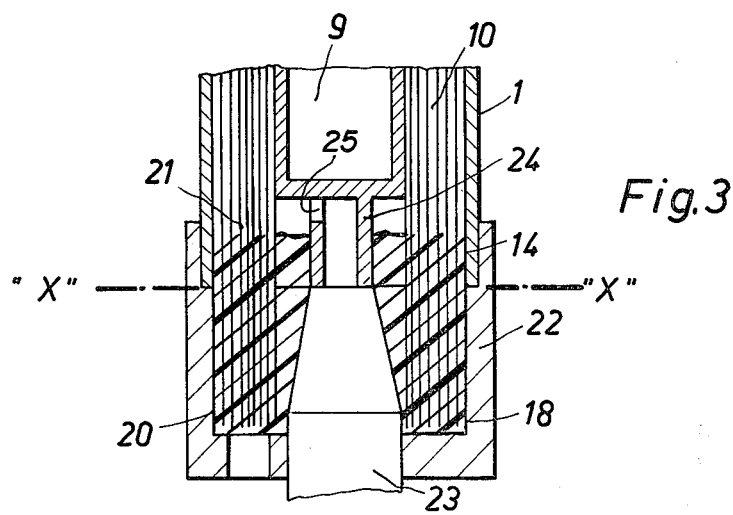
FIG. 3 is a section through the end of a hollow fiber dialyser partially broken away and during the pouring.

FIG. 3 shows one end of the hollow fiber dialyser without the cover member during the embedding process of the hollow fiber sections or pieces 10 in the pourable sealant 14. This process is accomplished with the aid of a mold 22 into which the open ends 18 of the hollow fiber pieces 10 extend. The opening of a nipple 24 protruding from the core 9 is sealed off during the pouring process, by means of a closure body 23.

When the pieces of hollow fibers 10 are fixed to one another by the poured sealant 14 within the mold 22, the closure thread 20, which pinches off the hollow fiber pieces 10 near their open end prevents the poured sealant from penetrating into the hollow fiber pieces 10.

The second sealing thread 21 arranged some distance from the closure thread 20 is loosely looped around the hollow fiber pieces 10 and prevents the poured sealant 14 from rising above some given level before it is set which it otherwise would due to capillary action.

After the setting is completed, the pouring mold 22 and the closure body 23 are removed from the hollow fiber dialyser 1 and the poured sealant is cut off along the dashed line X—X at both ends of the core. It is clear that as a result of the cutting of the poured sealant along the line X—X, the sealed ends of the hollow fibers including the closure thread 20 are removed whereby smooth faces are produced at both ends 12, 13. The ends of the hollow fibers are left open to the passage of liquids and the space between the hollow fibers is completely sealed off by the poured sealant. At this point the core may be placed into the tubular casing and the cover members 3, 4 may be placed on the core.

The manufacturing process of hollow fiber dialysers 1 is significantly simplified by using a web 11 comprising hollow fiber pieces 10 and by the arrangement of the closure threads 20 as well as by the additional threads 21 spaced at a predetermined distance. The simplification is achieved because it is assured that the poured sealant 14 does not penetrate into the ends of the hollow fibers 10, nor is it able to work it's way in an uncontrolled manner into the free space between the fibers.

The invention is not limited by the example embodiment shown in the drawings, rather, modifications may be made without departing from the basic teaching of this invention.

I claim:

1. A hollow fiber dialyser comprising core means, hollow fibers arranged about the core means in a ring formation, thread means binding said hollow fibers (10) to one another to form a web (11) of hollow fibers, said thread means extending across the web which is wrapped around the core means, said thread means comprising warp thread means (21) which are looped loosely as a wick barrier around the hollow fibers at each end of said web to prevent poured sealant (14) from leaking through between the hollow fibers by capillary action while the facing ends are being poured, said thread means further comprising closure thread means (20) at each end of said web, said closure thread means looping tightly around said hollow fibers for pinching off the free cross-section of said hollow fibers, whereby poured sealant is prevented from penetrating into the hollow fibers.

2. The hollow fiber dialyser of claim 1, wherein the hollow fibers (10) are arranged in parallel to one another, said binding thread means (16, 17) running lengthwise of said web but across said hollow fibers.

3. The hollow fiber dialyser of claim 1 or 2, wherein said warp thread means comprise at least one warp thread (21) located at a distance apart from the closure thread means (20), whereby the closure thread means (20) are located between the respective warp thread (21) and the end of the hollow fibers.

* * * * *